Figure 1:
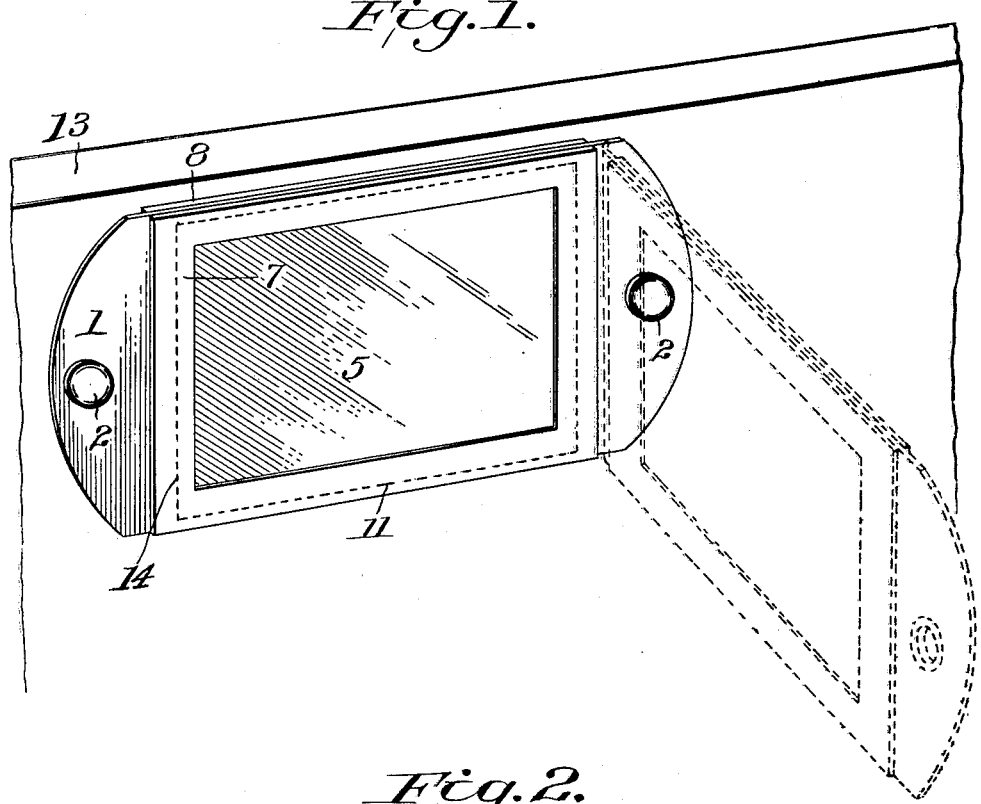

B. A. CUNNINGHAM.
DRIVER'S LICENSE HOLDER.
APPLICATION FILED AUG. 10, 1921.

1,408,566.

Patented Mar. 7, 1922.

Inventor:
Bruce A. Cunningham,
By Frederick V. Winters,
Attorney

UNITED STATES PATENT OFFICE.

BRUCE A. CUNNINGHAM, OF HACKENSACK, NEW JERSEY.

DRIVER'S LICENSE HOLDER.

1,408,566.     Specification of Letters Patent.     Patented Mar. 7, 1922.

Application filed August 10, 1921. Serial No. 491,129.

*To all whom it may concern:*

Be it known that I, BRUCE A. CUNNINGHAM, a citizen of the United States, residing at Hackensack, in the county of Bergen and State of New Jersey, have invented certain new and useful Improvements in Drivers' License Holders, of which the following is a full, clear, and exact specification.

This invention relates to license holders and has for its object to provide an improved device for carrying a plurality of license cards or certificates so that either of them may be readily displayed without subjecting the same to disfigurement or mutilation.

Another object is to provide a double license carrier having pockets for holding and displaying license cards on opposite faces thereof. A further object is to provide such a holder with means for detachably fastening the same to the dashboard, or other part of a vehicle, so that one of the license cards may be constantly displayed while the other may be readily disclosed by detaching one end of the holder and swinging the latter away from its supporting surface. Other objects will appear as the description proceeds.

The invention will be first hereinafter described in connection with the accompanying drawings, which constitute part of this specification, and then more specifically defined in the claims at the end of the description.

Figure 2:
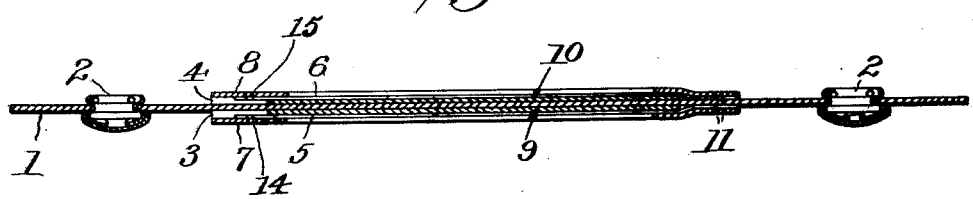

In the accompanying drawings, wherein similar reference characters are used to designate corresponding parts throughout the several views:

Figure 1 is a perspective view of a license holder constructed substantially in accordance with this invention, the same being shown attached to the dashboard of a vehicle and the position it assumes when one end is detached and swung away from the dashboard being indicated in dotted lines, and Figure 2 is a central longitudinal section of the holder.

The holder is composed of a central strip 1 of flexible material, such as leather or durable cloth, and shorter strips of similar material 7 and 8 secured along three of their edges to the central strip 1 in any suitable manner, as by stitching 11. One end of each of the strips 7 and 8 is left free from the central strip 1, providing openings or mouths 3 and 4, respectively, through which license cards or certificates 9 and 10 may be inserted into the pockets thus formed on opposite sides of the holder.

Each of the strips 7 and 8 is provided with a window covered by sheets of transparent material 5 and 6, respectively, the same being secured within the window openings by the same lines of stitching 11 which fasten the said strips 7 and 8 to the middle strip 1. Additional lines of stitching 14 and 15 secure the transparent sheets 5 and 6, respectively, to the ends of the strips 7 and 8 across the openings or mouths 3 and 4. The pockets thus formed on opposite faces of the holder are adapted to receive different license cards or certificates which may be arranged so as to be displayed through the windows on opposite faces of said holder. For instance, an automobile driver's license may be inserted in one of the pockets of the holder, and the car owner's license placed in the other pocket, so that either one of the licenses may be viewed by simply reversing the holder.

The projecting end portions of the central strip 1 are provided with snap fasteners 2 adapted to co-operate with supplemental fastener members secured to the dashboard 13 of the vehicle, as illustrated in Figure 1, or the holder may be detachably fastened at any other convenient place on the vehicle by other suitable means. When thus secured in place, one of the license cards in the holder will be constantly displayed through the window opening in the pocket on the exposed side thereof. In case the other license card is to be shown, one of the snap fasteners 2 may be disengaged from the dashboard 13, or other supporting surface, and the holder swung outward, as suggested in dotted lines in Figure 1, the flexible extension at one end of the middle strip 1 serving as a hinge. The flexible end portions of said middle strip 1 may also be folded upon the body of the holder when the same is carried in the pocket, as will be readily understood. When the holder is used in either way, it will be noted that the license cards may be readily viewed and are at the same time protected from wear and dampness which tends to quickly mutilate such license cards when they are carried loosely in the pocket and have to be taken out repeatedly for inspection.

I claim:

1. In a license holder of the character described, the combination with a central strip, of pockets secured to opposite faces of said strip, the latter having portions extending beyond the pockets, and means carried by said extending portions of the central strip for detachably fastening the holder to a support.

2. In a license holder of the character described, the combination with a central strip having flexible end portions, of pockets secured to opposite faces of said strip, and means carried by said flexible ends of the central strip for detachably fastening the holder to a support.

3. In a license holder of the character described, the combination with a central strip, of pockets secured to opposite faces of said strip, the latter having portions extending beyond the pockets, and means carried by said extending portions of the central strip for detachably fastening the holder to a support, said pockets having windows opening on opposite faces of the holder and covered by transparent material.

4. In a license holder of the character described, the combination with a central strip, of pockets secured to opposite faces of said strip, the latter having portions extending beyond the pockets, and means carried by said extending portions of the central strip for detachably fastening the holder to a support, said pockets having windows opening on opposite faces of the holder and covered by transparent material, one of said extending portions of the central strip being flexible to serve as a hinge when the other end portion is disconnected from the support, whereby the contents of both pockets may be readily displayed.

5. In a license holder of the character described, the combination with a central strip, of pockets secured to opposite faces of said strip and having windows opening at opposite sides thereof, said central strip extending beyond the pockets at opposite sides thereof, and separable fastener members carried by said extending portions of the central strip for co-operating with supplemental fastener members on a support for the purpose specified.

In testimony whereof I have signed my name to this specification.

BRUCE A. CUNNINGHAM.